United States Patent [19]
Jornhagen

[11] Patent Number: 6,076,834
[45] Date of Patent: Jun. 20, 2000

[54] SEALING ELEMENT

[75] Inventor: Lennart Jornhagen, Varnamo, Sweden

[73] Assignee: Forsheda AB, Forsheda, Sweden

[21] Appl. No.: 09/126,299

[22] Filed: Jul. 30, 1998

[30] Foreign Application Priority Data

Aug. 5, 1997 [SE] Sweden ................................ 9702863

[51] Int. Cl.⁷ ............................ F16J 15/06; F16L 21/035
[52] U.S. Cl. ........................ 277/617; 277/604; 277/608; 277/609; 277/627
[58] Field of Search .................... 277/617, 627, 277/609, 116, 608, 604

[56] References Cited

U.S. PATENT DOCUMENTS

| | | | |
|---|---|---|---|
| 1,608,470 | 11/1926 | Ferguson | 277/627 |
| 2,368,610 | 1/1945 | Fischer | 277/617 |
| 3,788,651 | 1/1974 | Brown et al. | 277/627 |
| 5,566,955 | 10/1996 | Preisendoefer | 277/617 |

*Primary Examiner*—Anthony Knight
*Assistant Examiner*—Enoch Peavey
*Attorney, Agent, or Firm*—Bakers & Daniels

[57] ABSTRACT

A sealing element (2) consisting of elastic material is adapted to be molded into for example a concrete pipe socket. In order to improve the binding between the sealing element and the material of the concrete pipe socket the sealing element is at least partially provided with fiber flock (14) at the surface portion which at the molding is adapted to be enclosed by the concrete material of the socket. (FIG. 1c)

22 Claims, 3 Drawing Sheets

SEALING ELEMENT

The present invention relates to a sealing element consisting of elastic material, for example a sealing ring.

When sealing two elements, for example two concrete pipes, in relation to each other it is common partially to mould a sealing element into one of the elements and then connect the elements with each other in a position in which the sealing element is sealingly compressed in a space between the elements. Thus, it is usual to mould a sealing ring into a concrete pipe socket at the cylindrical inner surface thereof and then sealingly connect the concrete pipe provided with the socket with another concrete pipe by jointing the socket with a spigot end of the other pipe. Thereby, the sealing ring which is partially moulded into the socket will in a sealing way be compressed between the inner surface of the socket and the outer surface of the spigot end so as to form a tight pipe joint. When jointing the two elements into the sealing position the sealing element is subjected to substantial forces which may cause that the sealing element is displaced from its correct moulded-in position which in turn causes that the sealing element takes an incorrect position in the joint between the elements. This is a serious problem at joints between well rings in which the sealing ring is at the jointing of the socket and the spigot end subjected to especially great forces. When moulding sealing rings into concrete pipe sockets it has because thereof been necessary to provide the sealing rings with radially projecting, bead-shaped retainer portions. Even if these retainer portions usually provide a satisfactory retaining of the sealing rings in the moulded-in position in the socket, they often provide substantial drawbacks such as providing an indication of fracture in the concrete material of the socket and preventing air and water from leaving the concrete during the moulding operation so that pockets appear in the concrete material in connection with the sealing ring.

Thus, the object of the present invention is to provide a sealing element in which the requirement for arranging projecting retainer portions on the sealing element is avoided.

In order to comply with this object there is according to the invention provided a sealing element consisting of elastic material, for example a sealing ring, the sealing element being adapted to be moulded into a first element, for example a concrete pipe socket, into a position in which a surface portion of the sealing element is enclosed by the material of the element and then to be compressed between said first element and a second element, for example a spigot end of a concrete pipe, in order to seal a space between said first and said second elements, the sealing element being characterized in that the surface portion of the sealing element enclosed by the material of the element is at least partially provided with fibre flock applied to said surface portion, the fibre flock improving the binding between the sealing element and the material of the element.

Thus, this fibre flock is firmly bound to said surface portion of the sealing element and will in an efficient way be bound to the material into which the sealing element is moulded. Thereby, there is without use of projecting retainer portions on the sealing element provided for such a retaining of the sealing element in the moulded-in position that the sealing element is maintained in its correct sealing position also when the sealing element is subjected to different forces during the jointing of the elements into the position in which the sealing element is compressed between the elements.

Preferably, the fibre flock is bound to said surface portion by means of an adhesive, for example a resin adhesive of two-component type. The fibre flock can consist of textile fibres, for example synthetic fibres of polyamide, having a length between 0.5 and 5 mm, preferably between 0.5 and 3 mm, the fibre flock comprising 50–300, preferably 150–300, fibres per square mm.

The sealing element can be of annular shape and can be adapted to be moulded into a substantially cylindrical inner surface of a pipe socket which preferably consists of concrete. Thereby, the sealing element can comprise a sealing portion and a mould portion, the sealing element being moulded into the pipe socket with the sealing portion positioned closest to the free end of the pipe socket. The sealing portion as well as the mould portion of the sealing ring can thereby be provided with fibre flock at the surface portions which are enclosed by the material of the pipe socket.

The surface portion of the sealing element positioned outside the material into which the sealing element is moulded can have a sliding surface adapted to cooperate with another element, and thereby the sliding surface can at least partially be provided with fibre flock applied to the sliding surface, the fibre flock being of the same kind as the fibre flock which is used for improving the binding between the sealing element and the material into which the sealing element is moulded. The fibre flock positioned on the sliding surface acts as a sliding agent or lubricant when connecting the element into which the sealing element is moulded with the other element.

The invention shall be described in the following with reference to the accompanying drawings.

Figure 1A:
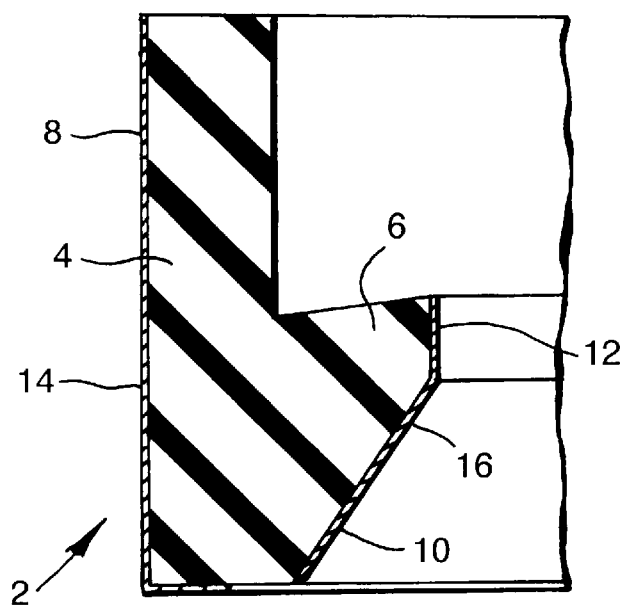
FIG. 1a is a section of a sealing element according to the invention constituted by a sealing ring.

The sealing ring 2 shown in section in FIG. 1a comprises a radially outer portion 4 adapted to be moulded into the material of an element and a radially inwardly directed sealing portion 6. The portion 4 has a cylindrical outer surface 8, while the sealing portion 6 has a conical sliding surface 10 and a cylindrical sliding surface 12 connected therewith.

The sealing ring 2 is adapted to be moulded into a concrete pipe socket at the inner surface thereof in order to seal the space between this socket and a spigot end introduced into the socket, a space being provided between the socket and a spigot end, in which space the sealing ring 2 is compressed for sealing said space. In order to provide an efficient binding between the sealing ring 2 and the concrete material into which the sealing ring 2 is moulded the portion 4 has at its cylindrical surface 8 and at a connecting portion of the end surface of the sealing ring a layer 14 consisting of fibre flock. The fibre flock 14 consists of textile fibres, for example synthetic fibres consisting of polyamide, having a length of for example 5 mm. The fibre flock 14 comprises a relatively large number of fibres per square mm of said surfaces of the sealing ring 2, for example 150–300 fibres per square mm. The fibre flock 14 is bound to said surfaces of the sealing ring 2 by means of an adhesive, for example a resin adhesive of two-component type. The fibre flock is applied by means of conventional technique, according to which said surfaces of the sealing ring is initially provided with a layer of adhesive whereupon electrically charged fibres are supplied to the adhesive in which they are retained and bound.

When the sealing ring 2 has been moulded into the concrete pipe socket and a spigot end shall be introduced into the socket in order to seal the space between the socket and the spigot end, the spigot end will, as mentioned above, slide against the conical surface 10 and the cylindrical surface portion 12 of the sealing ring 2. In order to facilitate the sliding also the conical surface 10 and the cylindrical surface portion 12 are provided with a layer 16 of fibre flock. The fibre flock 16 is of the same kind as the fibre flock 14 and is applied to the sealing ring 2 by means of the conventional technique described above.

The fibre flock 14 provides for such a binding of the sealing ring 2 to the concrete material of the socket that the sealing ring must not be provided with any radially projecting retainer portions decreasing the strength of the socket. The fibre flock 16 provides that it is at the pipe jointing not necessary to apply any lubricant for improving the sliding between the spigot end and the sealing ring.

Figure 1B:
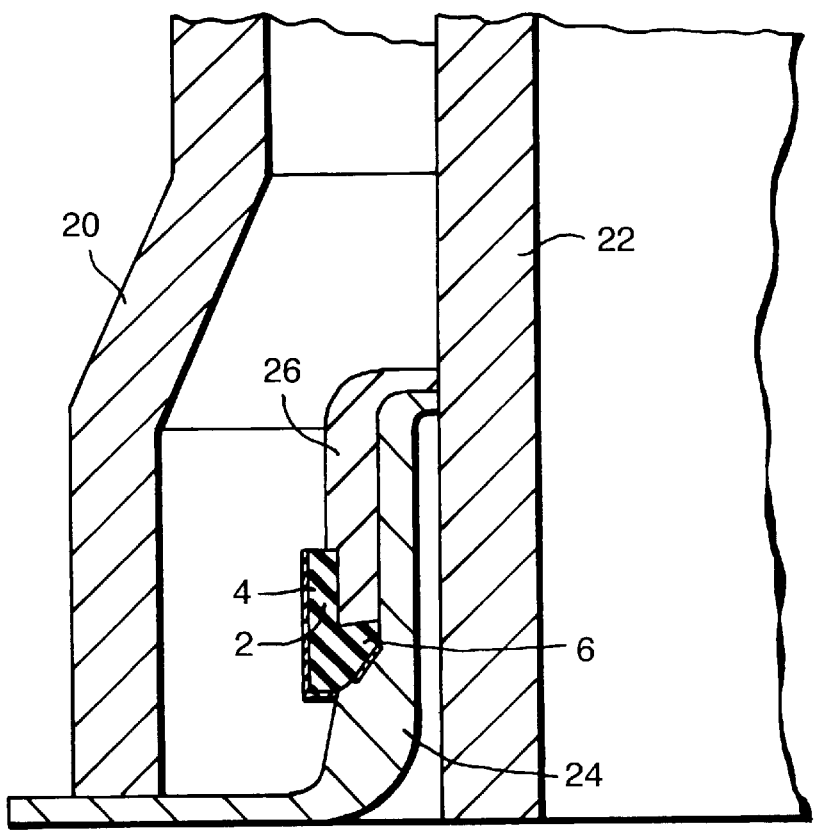
FIG. 1b is a section of the sealing ring shown in FIG. 1a positioned in a mould for moulding a concrete pipe provided with a socket.
Figure 1C:
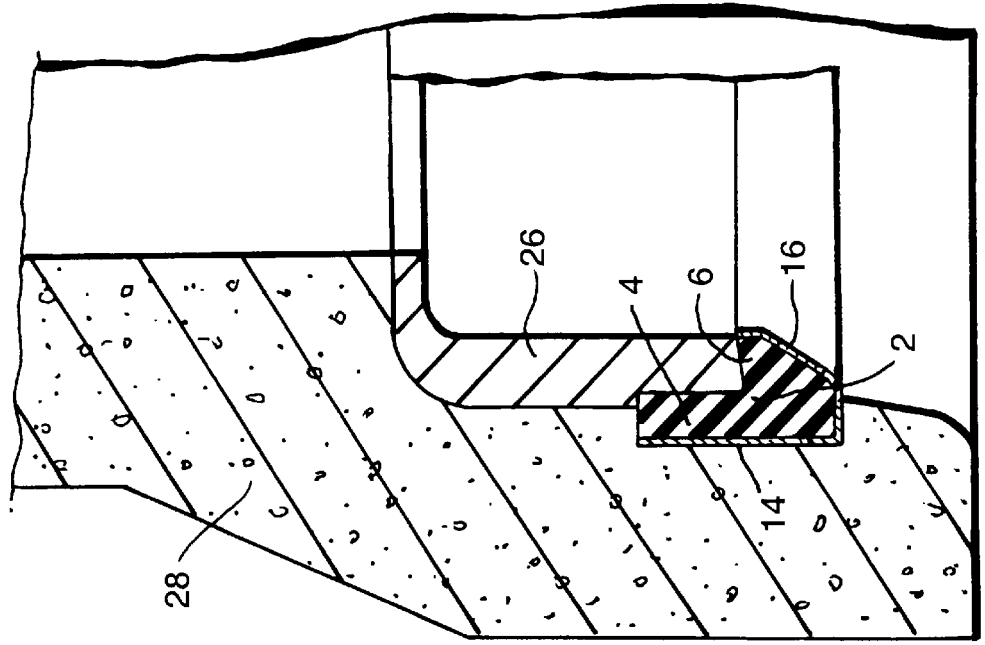
FIG. 1c is a section of the sealing ring according to FIG. 1a moulded into a concrete pipe socket.

FIG. 1b illustrates the moulding of the sealing ring 2 into a concrete pipe socket. The concrete pipe is moulded by means of a mould which in a conventional way consists of two concentric mould elements 20 and 22 for providing the outer and inner surfaces of the pipe wall and a bottom ring or pallet 24 for forming the inner surface of the socket portion of the pipe and the end surface thereof. Before the concrete is moulded into the mould thus provided there is against the bottom ring 24 positioned a sleeve 26 consisting of cellular styrene plastic as well as the sealing ring 2 consisting of rubber or rubber-elastic material. When concrete is moulded into the mould, the surface portions of the sealing ring positioned outside the sleeve 26 and the bottom ring 24 are firmly moulded into the concrete, while the bottom ring 24 and the sleeve 26 will define the rest of the inner surface of the socket of the pipe. When the concrete has hardened, the concrete pipe is removed from the mould elements 20 and 22 and the bottom ring 24, while the sealing ring 2 and the sleeve 26 are left in the socket 28 of the pipe, as shown in FIG. 1c. When a spigot end shall be connected with the socket 28, the sleeve 26 is removed and the spigot end is in axial direction introduced into the socket while the outer surface of the spigot end slides against the fibre flock 16 on the sealing portion 6. Because of the efficient binding of the sealing ring 2 to the socket 28 by means of the fibre flock 14, the sealing ring 2 is securely retained in the socket in spite of the forces affecting the sealing ring 2 in connection with the pipe jointing.

Figure 2C:
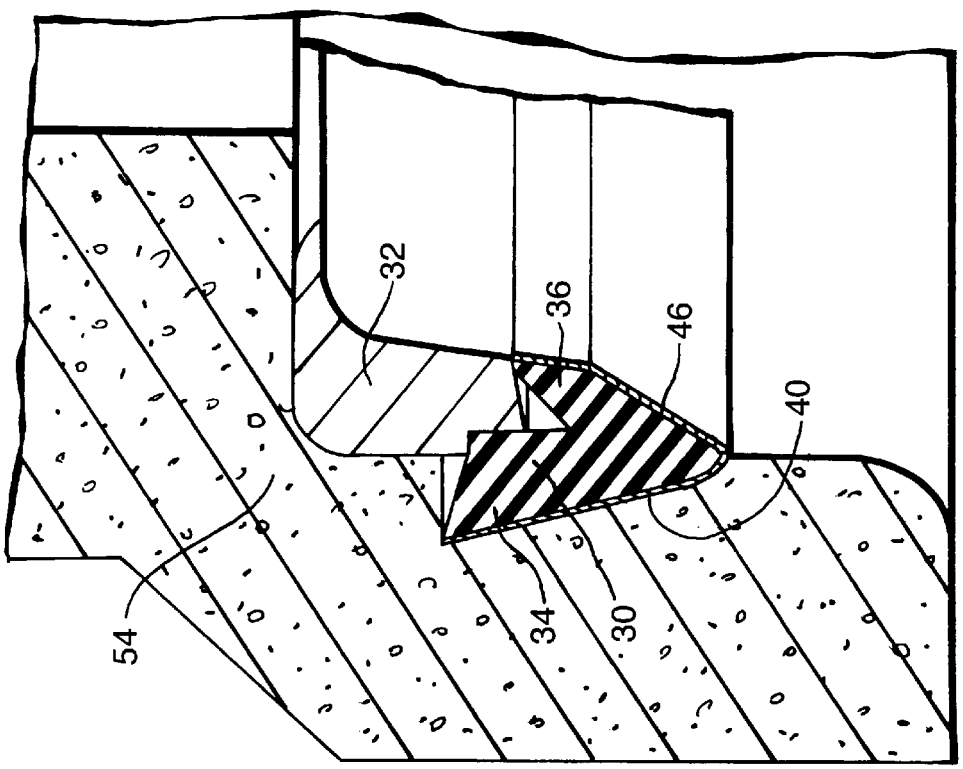
FIG. 2c is a section of the sealing element according to FIG. 2a moulded into a concrete pipe socket.
Figure 2A:
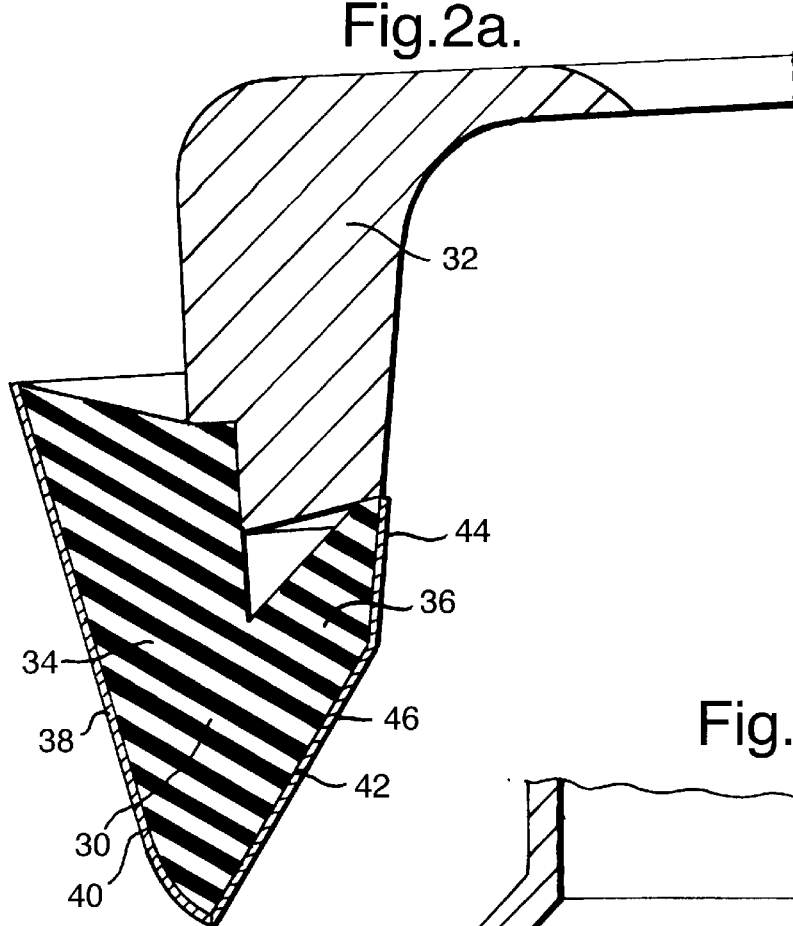
FIG. 2a is a section of a sealing element consisting of a sealing ring and a mould ring, the sealing element being designed in accordance with the invention.

In FIG. 2a there is shown a section of a sealing element consisting of a sealing ring 30 of solid elastic material, preferably rubber, and a mould ring 32 of easily deformable cellular rubber material. The sealing ring 30 has a mould-in-portion 34 which is adapted to be moulded into a concrete pipe socket, and a sealing portion 36 which is adapted subsequently to the moulding of the sealing ring 30 into the concrete pipe socket to project inwardly into the socket so as to engage a spigot end introduced into the socket. When the spigot end is introduced into the socket, the sealing ring 30 is compressed between the socket and the spigot end so as to seal the joint between the socket and the spigot end. At its surface 38 which is adapted to be moulded into the socket the mould-in-portion 34 of the sealing ring has a layer 40 of fibre flock of the same kind as the fibre flock 14 in the embodiment according to FIG. 1a. The fibre flock 40 provides for a firm connection between the sealing ring 30 and the concrete material of the socket without requiring the use of any retainer portions projecting from the sealing ring and having a negative influence on the strength of the socket. The sealing portion 36 of the sealing ring 30 has a conical surface portion 42 and a cylindrical surface portion 44, said surface portions being adapted to slide against the spigot end when this is introduced into the socket. In order to improve the sliding and make it unnecessary to apply a lubricant, the surface portions 42 and 44 are provided with a layer 46 of fibre flock of the same kind as the fibre flock 40 and the layers of fibre flock appearing in the embodiment according to FIG. 1a.

As mentioned, the annular mould portion 32 consists of an easily deformable cellular rubber which makes it possible to leave the mould portion 32 in the socket subsequently to the moulding and at the jointing which is provided by introducing a spigot end into the socket. The deformation of the sealing portion 36 caused by the spigot end is taken up by the mould portion 32, and the mould portion 32 also allows a certain angular positioning of the spigot end in relation to the socket. Even if this is not shown in FIG. 2a, the mould portion 32 can at its surface which is adapted to be moulded into the socket and/or at its surface adapted to slide against the spigot end be provided with layers of fibre flock of the same kind as the layers 40 and 46 of the sealing portion 30.

Figure 2B:
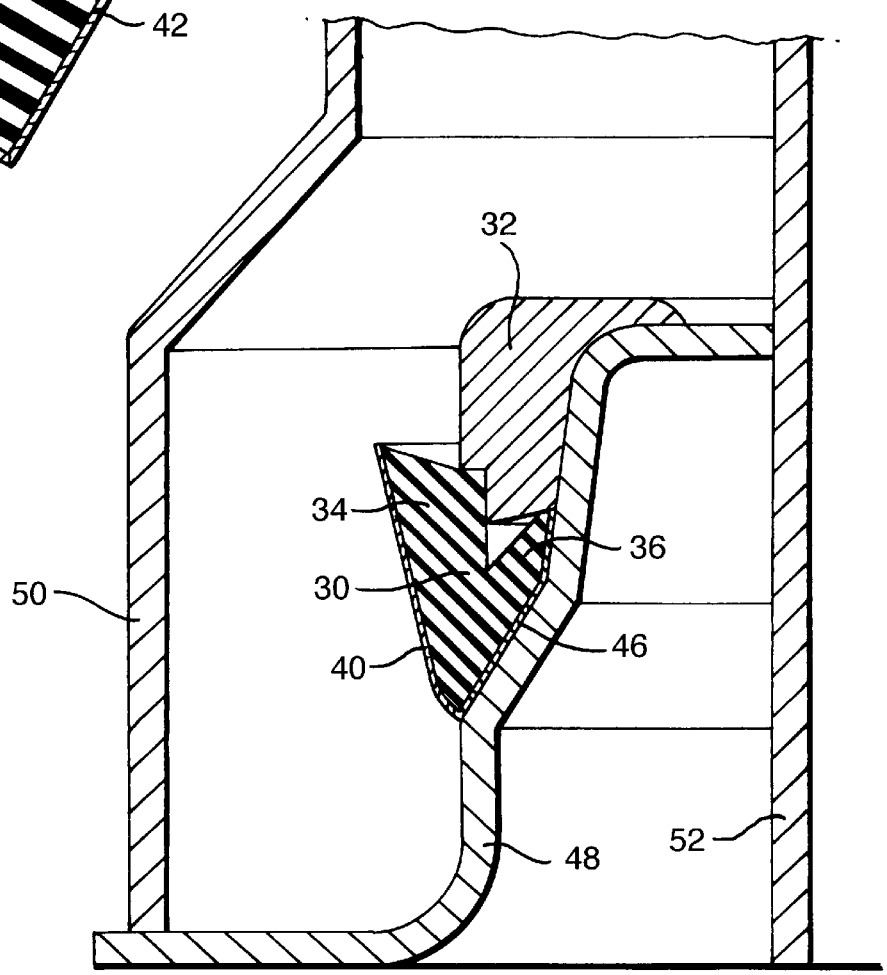
FIG. 2b is a section of the sealing element according to FIG. 2a positioned in a mould for moulding a concrete pipe having a socket into which the sealing element according to FIG. 2a shall be moulded.

FIG. 2b shows the sealing element consisting of the sealing portion 30 and the mould portion 32 positioned on a bottom ring or pallet 48 which together with mould portions 50 and 52 constitute the mould for moulding a concrete pipe provided with a socket.

FIG. 2c shows the sealing element consisting of the sealing ring 30 and the mould ring 32 moulded into a concrete pipe socket 54, in which the fibre flock layer 40 provides for an efficient binding between the sealing ring 30 and the concrete material of the socket 54 and the fibre flock layer 46 facilitates the sliding between the sealing ring 30 and a spigot end which at the pipe jointing is introduced into the socket 54. As previously mentioned also the mould ring 32 can be provided with a fibre flock layer so as to improve the binding to the concrete material of the socket 54 and improving the sliding in relation to the spigot end introduced into the socket.

The invention can be modified within the scope of the following claims.

I claim:

1. A sealing element (2; 30, 32) of elastic material, the sealing element being adapted to be moulded into a first element (28; 54) in a position in which a surface portion of the sealing element is enclosed by the material of the first element and then to be compressed between said first element and a second element in order to seal a joint between said first and said second elements, wherein the surface portion of the sealing element enclosed by said first element (28; 54) is at least partially provided with fibre flock (14; 40) applied to said surface portion, said fibre flock improving the binding between the sealing element and the material of said first element.

2. A sealing element as claimed in claim 1, characterized in that the fibre flock (14; 40) is bound to said surface portion by means of an adhesive.

3. A sealing element as claimed in claim 2, characterized in that the fibre flock (14; 40) consists of textile fibres having a length of between 0.5 and 5 mm.

4. A sealing element as claimed in claim 2, characterized in that the fibre flock (14; 40) includes 50–300 fibres per square mm.

5. A sealing element as claimed in claim 2, characterized in that the sealing element (4; 30, 32) is of annular shape and is adapted to be moulded into a pipe socket (28; 54) at a substantially cylindrical inner surface of said pipe socket.

6. A sealing element as claimed in claim 2, characterized in that the sealing element (2: 30, 32) has outside its surface portion enclosed by the material of said first element (28; 54) a sliding surface adapted to cooperate with said second element and that the sliding surface is at least partially provided with fibre flock (16; 46) applied to said sliding surface.

7. A sealing element as claimed in claim 2, wherein said adhesive is a resin adhesive of two-component type.

8. A sealing element as claimed in claim 1, characterized in that the fibre flock (14; 40) consists of textile fibers having a length of between 0.5 and 5 mm.

9. A sealing element as claimed in claim 8, characterized in that the fibre flock (14; 40) includes 50–300 fibres per square mm.

10. A sealing element as claimed in claim 8, characterized in that the sealing element (4; 30, 32) is of annular shape and is adapted to be moulded into a pipe socket (28; 54) at a substantially cylindrical inner surface of said pipe socket.

11. A sealing element as claimed in claim 8, characterized in that the sealing element (2: 30, 32) has outside its surface portion enclosed by the material of said first element (28; 54) a sliding surface adapted to cooperate with said second element and that the sliding surface is at least partially provided with fibre flock (16; 46) applied to said sliding surface.

12. A sealing element as claimed in claim 8, wherein said textile fibres are synthetic fibres of polyamide having a length of between 0.5 and 3 mm.

13. A sealing element as claimed in claim 1, characterized in that the fibre flock (14; 40) includes 50–300 fibres per square mm.

14. A sealing element as claimed in claim 13, characterized in that the sealing element (4; 30, 32) is of annular shape and is adapted to be moulded into a pipe socket (28; 54) at a substantially cylindrical inner surface of said pipe socket.

15. A sealing element as claimed in claim 13, characterized in that the sealing element (2: 30, 32) has outside its surface portion enclosed by the material of said first element (28; 54) a sliding surface adapted to cooperate with said second element and that the sliding surface is at least partially provided with fibre flock (16; 46) applied to said sliding surface.

16. A sealing element as claimed in claim 13, wherein said fibre flock includes 150–300 fibres per square mm.

17. A sealing element as claimed in claim 1, characterized in that the sealing element (4; 30, 32) is of annular shape and is adapted to be moulded into a pipe socket (28; 54) at a substantially cylindrical inner surface of said pipe socket.

18. A sealing element as claimed in claim 17, characterized in that the sealing element comprises a sealing portion (30) and a mould portion (32), that the sealing element (30) is moulded into the pipe socket with the sealing portion positioned closest to the free end of the pipe socket and that the sealing portion as well as the mould portion have surface portions enclosed by the pipe socket and provided with fibre flock.

19. A sealing element as claimed in claim 18, characterized in that the sealing element (2: 30, 32) has outside its surface portion enclosed by the material of said first element (28; 54) a sliding surface adapted to cooperate with said second element and that the sliding surface is at least partially provided with fibre flock (16; 46) applied to said sliding surface.

20. A sealing element as claimed in claim 17, characterized in that the sealing element (2: 30, 32) has outside its surface portion enclosed by the material of said first element (28; 54) a sliding surface adapted to cooperate with said second element and that the sliding surface is at least partially provided with fibre flock (16; 46) applied to said sliding surface.

21. A sealing element as claimed in claim 1, characterized in that the sealing element (2; 30, 32) has outside its surface portion enclosed by the material of said first element (28; 54) a sliding surface adapted to cooperate with said second element and that the sliding surface is at least partially provided with fibre flock (16; 46) applied to said sliding surface.

22. A sealing element as claimed in claim 1, wherein said first element is a concrete pipe socket and said second element is the spigot end of a concrete pipe.

* * * * *